Dec. 21, 1948.  S. R. GREENBERG  2,456,632
EDUCATIONAL DEVICE FOR TEACHING CORRECT PENMANSHIP
Filed Sept. 25, 1945  2 Sheets-Sheet 1

INVENTOR
Samuel R. Greenberg
BY
Blair, Curtis + Hayward
ATTORNEYS

Dec. 21, 1948.   S. R. GREENBERG   2,456,632
EDUCATIONAL DEVICE FOR TEACHING CORRECT PENMANSHIP
Filed Sept. 25, 1945   2 Sheets-Sheet 2
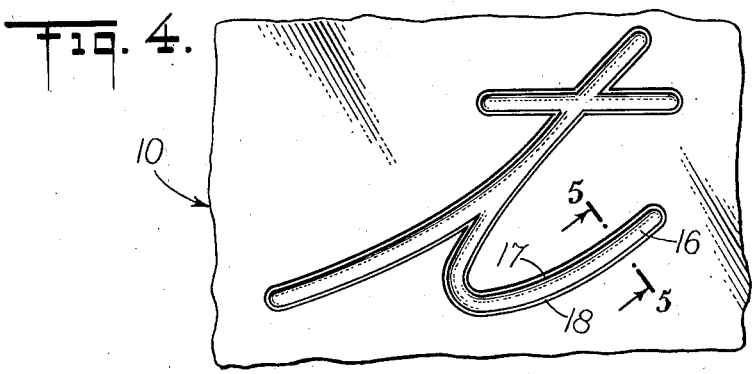
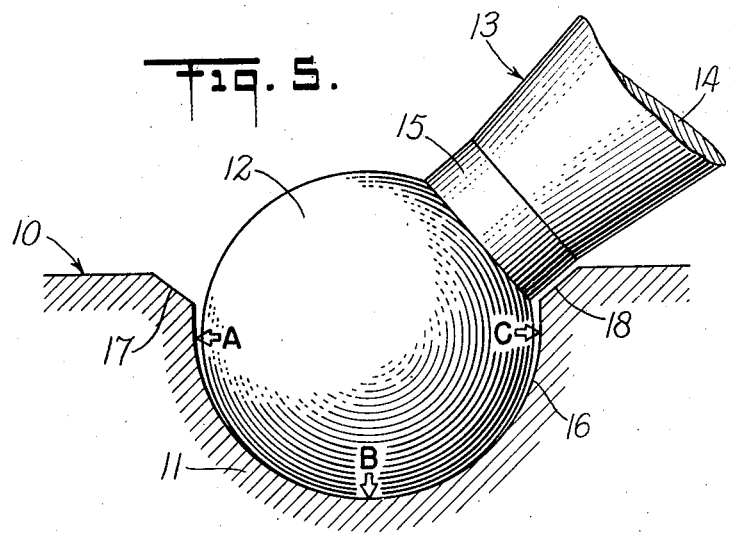
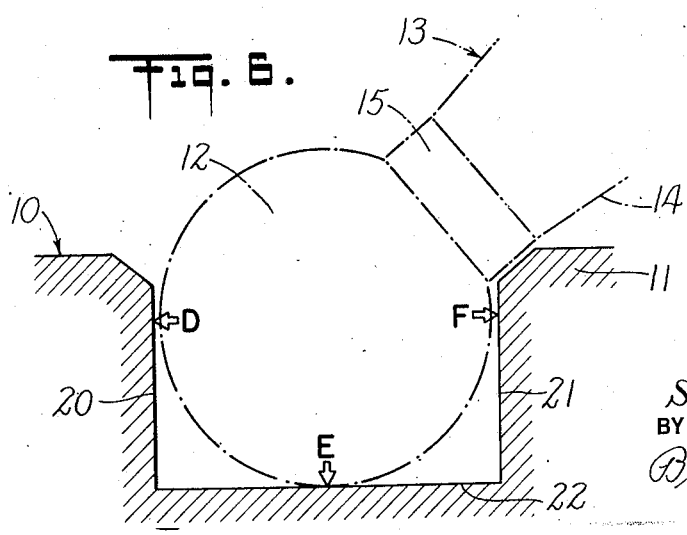
INVENTOR
Samuel R. Greenberg
BY
Blair, Curtis & Hayward
ATTORNEYS Patented Dec. 21, 1948

2,456,632

UNITED STATES PATENT OFFICE 2,456,632

EDUCATIONAL DEVICE FOR TEACHING CORRECT PENMANSHIP

Samuel R. Greenberg, New York, N. Y.

Application September 25, 1945, Serial No. 618,440

4 Claims. (Cl. 35—37)

This invention relates to an educational device for teaching correct penmanship.

One of the objects of this invention is to provide an educational device for teaching penmanship which is characterized by free flowing action between the moving parts of the device combined with a maximum of guidance for the user. Another object is to provide a new and improved device of the above character. Another object is to provide a device of the above character which is simple and thoroughly practical. A further object is to provide a device of the above character which is durable and well able to withstand hard usage. Still another object is to provide a construction of the above character which will be economical both from the standpoint of labor and materials used. Other objects will be in part obvious and in part pointed out hereinafter.

The invention accordingly consists in the features of construction, combination of elements, and arrangements of parts, all as will be illustratively described herein, and the scope of the application which will be indicated in the following claims.

Referring now to the drawings in which is shown one of the various possible embodiments of this invention, Figure 1 is a plan view of the guiding plate of the educational device;

Figure 4 is a top plan view on an enlarged scale of a portion of the plate shown in Figure 1;

Figure 5 is a vertical section on an enlarged scale taken on the line 5—5 of Figure 4, showing the tracing point of the writing implement shown in Figure 3 in tracing position thereon; and, Figure 6 is a view similar to Figure 5 illustrating a modification in the shape of the tracing groove.

Similar reference characters refer to similar parts throughout the several views of the drawings.

This application is a continuation-in-part of my abandoned application for "Means for training a correct writing habit," filed December 21, 1944, and bearing Serial No. 569,147.

As conducive to a clearer understanding of certain features of this invention, it might here be pointed out that difficulty with this type of educational device has been experienced in the past for two main reasons. The first difficulty lies in the fact that there has been undue friction between the tracing point and the groove being traced. Such friction, if it did not entirely prevent, is a serious hindrance to the free flowing movement of the hand of the user, which is a fundamental necessity in teaching penmanship by this method. The second difficulty lies in the fact that the fit between the tracing point and the groove was incorrect so that at normal free flowing writing it was extremely difficult, if not impossible, to keep the writing implement in the groove. This is a point of major importance because the primary object of a device of this type is the guidance of the user and thus the tracing point must stay in the groove regardless of the direction of pressure applied to it. Accordingly, it is a further object of this invention to overcome these difficulties.

Figure 1:
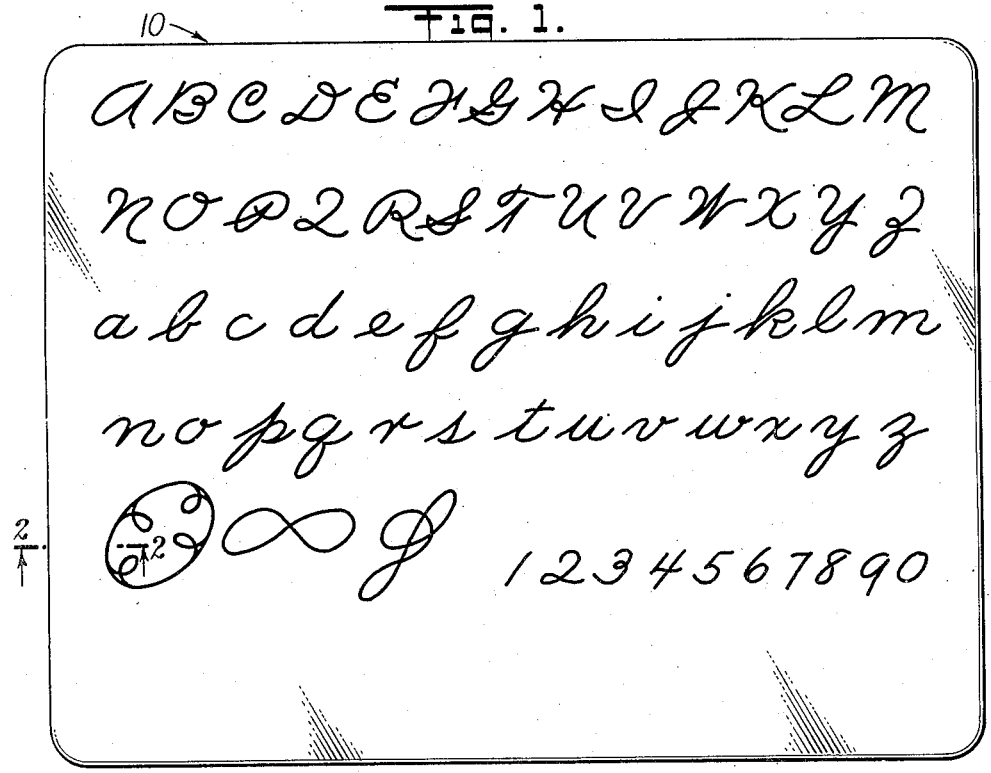

Referring now to the drawings, the guiding plate 10 shown in Figure 1 is flat and preferably made of a clear plastic such as "Lucite" which may be readily worked, is relatively hard, and may be polished so that the surface is smooth. The plate has letters of the alphabet, numerals, and other figures cut into or otherwise formed in its surface so that each letter or figure is outlined by a groove extending downwardly into the body 11 (Figure 2) of the plate.

Figure 3:
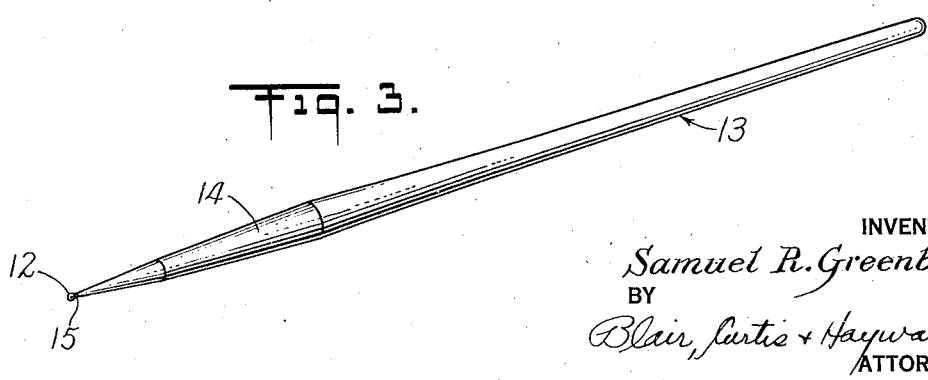
Figure 3 is a side elevation of the writing implement used in conjunction with the plate shown in Figure 1.

Referring to Figure 3 in which the writing implement 13 is shown, its body 14 is suitably shaped so that it may be readily gripped and held by the user. The tracing point 12 of the implement is spherical in shape and made of a hard material which will take a high polish, such as stainless steel. The tracing point 12 (Figure 5) is connected to the end of the writing implement in any suitable manner and the point of connection between the writing implement and the tracing point is preferably covered by a collar 15 made of a material similar to the tracing point and also highly polished. The diameter of the tracing point 12 is approximately one-sixteenth of an inch and the diameter of collar 15 is sufficiently small so that the tracing point almost comprises an entire sphere.

As the grooves forming each of the letters and figures in plate 10 (Figure 1) are substantially similar in construction, detailed description will be limited to the groove forming the letter "t" (Figure 4). The groove of the letter "t" is preferably formed during the molding of plate 10 or by embossing, as these methods result in groove surfaces which are very smooth if proper dies are used. In cross-section, the lower portion of groove 16 (Figure 5) or that portion of the groove below the points "A" and "C" is semi-circular. The radius of curvature of this portion of the groove is approximately 1/1000 of an inch greater than the radius of the tracing point 12. Above the points A and C the walls of the groove extend vertically upwardly to the groove's beveled edges 17 and 18. The beveled edges of the groove preferably slant at an angle of 40° to the plane of the surface of plate 12 and coact with collar 15 to form an additional guiding surface for the writing implement when the writing implement is held at an angle of 40°.

In use, the tracing point rides on the bottom of the groove, contacting the groove at the point B. Because of the differences in radius between the tracing point 12 and the semi-circular bottom of the groove, the tracing point can only touch the surface of the groove at one point at one time and because of this and the smooth surfaces of the groove and tracing point, the tracing point may be moved along the groove with a maximum of ease. If pressures are applied to the tracing point to move it in a direction transverse to the groove, then the point of contact between the tracing point and the groove may move up either side wall of the groove as high points A or C. As the side walls extend a substantial distance above these points, the tracing point cannot be moved out of a groove by pressure transverse to the guiding plate. Thus, as the normal angle for holding a writing implement is between 40° and 50° the tracing point at all times is retained in the groove unless it is lifted from it.

Accordingly, by constructing the groove and the tracing point in the form of a male and female union as described hereinabove, the tracing point can be moved along the groove with a minimum of effort. Furthermore, the tracing point is retained in the groove in an efficient and practical manner so that a maximum of guidance can be obtained from the use of the device. In addition, the coaction of the ball point and the groove permits free movement of the writing implement to accommodate the roll of the wrist and forearm during writing. Also the groove and tracing point are so constructed that transverse movement of the tracing point with respect to the groove is kept to a minimum, thus greatly increasing the guiding efficiency of the device.

Figure 2:
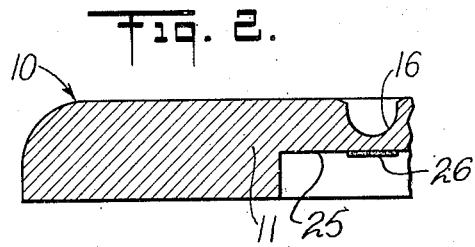
Figure 2 is a vertical section on an enlarged scale taken on the line 2—2 of Figure 1.

Referring to Figures 1 and 2, the bottom of the plate is preferably indented as at 25 beneath the figures to permit an outline 26 of each figure to be formed on the under surface of the plate immediately beneath the bottom of each groove. These outlines may be placed on the plate in any suitable manner such as by stenciling and are made of an opaque material. Because the plate is made of a clear plastic, these outlines bring out the shape of each figure on the plate so that it is clear and distinct.

Referring to Figure 6, a modification of the groove shown in Figure 5 is illustrated. The same type of tracing point is used and the groove has a pair of vertical, parallel side walls 20 and 21 and a bottom 22. The distance between side walls 20 and 21 is approximately 2/1000 of an inch greater than the diameter of the tracing point and the depth of the side walls is substantially greater than the radius of the tracing point, the radius of the tracing point being indicated on the side walls by the arrows D and F. The upper edges of this groove are beveled in a manner similar to the beveled edges of groove 16 (Figure 5) and coact with the collar 15 of the writing implement in a similar manner.

In use, in this embodiment the tracing point contacts the groove at only three points, namely E, D and F. Because the walls and bottom of this type of groove are at all times tangent to the spherical tracing point at the point or points at which the tracing point is contacting the groove, a minimum of friction results so that the tracing point may be moved through the groove with a maximum of ease. Also because of the construction of this groove, the tracing point is efficiently guided.

Accordingly, it will be seen that a thoroughly practical and efficient educational device for teaching penmanship has been described in which because friction is reduced to a minimum, free flowing action of the writing implement is attained. Furthermore, because of the male and female union of the tracing point and groove and because of the construction of the groove, the tracing point is at all times retained within the groove. It will thus be seen that the several objects hereinabove mentioned, as well as many others, have been successfully accomplished.

As many possible embodiments may be made of the above invention, all without departing from the scope of the invention, it is to be understood that all matter hereinbefore set forth or shown in the accompanying drawings is to be interpreted as illustrative and not in a limiting sense.

I claim:

1. In an educational device for teaching penmanship including a guiding plate having figures in outline form thereon and a writing implement for tracing the figures, the combination of, a plate having a plurality of figures outlined thereon by means of grooves, the bottom of said grooves being semi-circular in cross-section, and a writing implement having a spherically shaped tracing point, the width of the point of connection between said tracing point and the body of said writing implement being substantially less than the diameter of said tracing point, the radius of curvature of said tracing point being slightly shorter than the radius of curvature of said grooves, said grooves being of substantially greater depth than the radius of the spherical tracing point of said writing implement, substantial portions of the walls of said grooves above their curved bottoms being substantially vertical.

2. In an educational device for teaching penmanship including a guiding plate having figures in outline form thereon and a writing implement for tracing the figures, the combination of, a plate having a plurality of figures outlined therein by means of grooves, a writing implement, said writing implement having a spherically shaped tracing point, the width of the point of connection between said tracing point and the body of said writing implement being substantially less than the diameter of said tracing point, the depth of said grooves being substantially greater than the radius of said spherical tracing point, substantial portions of the upper portions of the walls of said groove being substantially vertical.

3. In an educational device for teaching penmanship including a guiding plate having figures in outline form thereon and a writing implement for tracing the figures, the combination of, a plate made of a clear plastic material having a plurality of figures outlined therein by means of grooves, a writing implement, said writing implement having a spherically shaped tracing point, the depth of said grooves being substantially greater than the radius of said spherical tracing point, and the width of said grooves being slightly greater than the diameter of said tracing point, and opaque material on the under surface of said plate outlining the shape of each of the figures on said plate.

4. In an educational device for teaching penmanship including a guiding plate having figures in outline form thereon and a writing implement for tracing the figures, the combination of, a plate having a plurality of figures outlined thereon by means of grooves, the side walls of said grooves being perpendicular and the bottom of said grooves being flat, a writing implement, and a spherically shaped tracing point connected to the end of said writing implement, the width of the point of connection between said tracing point and the body of said writing implement being substantially less than the diameter of said tracing point, the width of said grooves being slightly greater than the diameter of said tracing point, and the depth of said grooves being substantially greater than the radius of said tracing point.

SAMUEL R. GREENBERG.

REFERENCES CITED

The following references are of record in the file of this patent:

UNITED STATES PATENTS

| Number | Name | Date |
|---|---|---|
| 235,898 | Rogers | Dec. 28, 1880 |
| 716,629 | Dodge | Dec. 23, 1902 |
| 1,016,913 | Hughes | May 13, 1912 |
| 1,028,029 | Killebrew | May 28, 1912 |
| 1,455,579 | Evans | May 15, 1923 |
| 1,824,513 | Tibbetts | Sept. 27, 1931 |
| 2,277,329 | Kimbrough | Mar. 24, 1942 |

FOREIGN PATENTS

| Number | Country | Date |
|---|---|---|
| 14,412 | Great Britain | 1889 |
| 111,517 | Great Britain | 1917 |
| 136,892 | Germany | 1902 |
| 294,060 | Germany | 1916 |
| 498,023 | Great Britain | 1937 |
| 629,856 | Germany | 1936 |